United States Patent

Hatanaka

[11] Patent Number: 5,597,288
[45] Date of Patent: Jan. 28, 1997

[54] SCREW TYPE WATER FLOW GENERATING APPARATUS

[76] Inventor: Miyoshi Hatanaka, 22-19, Matsubara 5-chome, Setagaya-ku, Tokyo 156, Japan

[21] Appl. No.: 223,817

[22] Filed: Apr. 6, 1994

Related U.S. Application Data

[63] Continuation of Ser. No. 915,128, Jul. 17, 1992, abandoned.

[30] Foreign Application Priority Data

Jun. 9, 1992 [JP] Japan ..................................... 4-173701

[51] Int. Cl.⁶ .................................................. F04D 29/42
[52] U.S. Cl. .................................. 415/182.1; 416/247 R; 4/492; 4/541.1; 4/904; 248/214
[58] Field of Search ........................... 415/182.1, 213.1; 416/247 R, 247 A; 248/214, 637; 4/904, 492, 496, 541.1, 541.2, 541.3, 541.4, 541.5, 541.6

[56] References Cited

U.S. PATENT DOCUMENTS

| | | | |
|---|---|---|---|
| 760,634 | 5/1904 | Lanpher | 248/214 |
| 957,324 | 5/1910 | Gall | 248/214 |
| 2,194,037 | 3/1940 | Thuma | 248/214 |
| 2,925,916 | 2/1960 | Pollock | 248/214 |
| 3,086,715 | 4/1963 | Mineau et al. | 4/492 |
| 3,674,020 | 7/1972 | Jacuzzi | 4/492 |
| 3,934,537 | 1/1976 | Hall | 403/220 |
| 4,193,209 | 3/1980 | Lovison et al. | 416/247 R |
| 4,352,215 | 10/1982 | Laing | 4/492 |
| 4,561,133 | 12/1985 | Laing | 4/128 |
| 4,599,753 | 7/1986 | Goodman | 4/496 |
| 4,665,572 | 5/1987 | Davidson et al. | 4/492 |
| 4,903,926 | 2/1990 | McNarry et al. | 248/214 |
| 4,944,434 | 7/1990 | Hamiton | 248/214 |
| 5,050,863 | 9/1991 | Yacoboski | 4/496 |
| 5,333,322 | 8/1994 | Weir | 4/496 |

FOREIGN PATENT DOCUMENTS

| | | | |
|---|---|---|---|
| 695409 | 12/1930 | France | 416/247 R |
| 1024669 | 4/1953 | France | 416/247 |

*Primary Examiner*—John T. Kwon
*Attorney, Agent, or Firm*—Oblon, Spivak, McClelland, Maier & Neustadt, P.C.

[57] ABSTRACT

A screw driving device is loaded within a box-shaped casing, straightening plates are disposed on the front surface of the casing so as to face to the front surface of screw vanes, and water holes are bored in a rear portion and side portions of the casing, the casing being held on a support frame mechanism capable of being adjusted in vertical movement.

2 Claims, 8 Drawing Sheets

SCREW TYPE WATER FLOW GENERATING APPARATUS

This application is a continuation of application Ser. No. 07/915,128, filed on Jul. 17, 1992, now abandoned.

BACKGROUND OF THE INVENTION AND RELATED ART STATEMENT

1. Field of the Invention

This invention relates to a water flow generating apparatus used for various water-flow water tanks such as a water flow pool, a water flow fish tank, and the like to generate a water flow within the water tanks due to a jetting action, and more specifically to a screw type water flow generating apparatus in which a jet is obtained by rotation of screw vanes.

2. Related Art

Various kinds of water flow generating apparatuses for a water flow pool or the like are known. But, as compared with, for example, a jet injection type among others, a screw type is recommended which can be installed at a relatively low cost in terms of equipment expenses and is advantageous in view of an economical point. However, the water flow generating apparatus of this kind heretofore known is only a so-called fixed system in which the apparatus is integrally incorporated into a water flow pool.

In the aforementioned water flow generating apparatus of the fixed system, the apparatus itself becomes large in size, and in addition, it takes time for installation work of the apparatus, unavoidably increasing the cost, which comprises a bottleneck for popularization.

OBJECT AND SUMMARY OF THE INVENTION (Object)

The present invention has been accomplished in view of the foregoing. An object of the present invention is to provide a handy water flow generating apparatus using a screw which is intended to lower an expense of fabrication and which can be installed simply without requiring much time for installation.

(Means for Solving the Problem)

For achieving the aforesaid object, the screw type water flow generating apparatus according to the present invention employs the following structures:

According to a first invention, there is provided a screw type water flow generating apparatus characterized in that within a box-shaped casing are provided, from an upper portion, an engine portion for obtaining a rotating and driving force, a rotating and driving force transmission portion operatively connected to said engine portion and a screw rotating shaft operatively connected to said rotating and driving force transmission portion and arranged in a horizontal direction, said screw rotating shaft being disposed through a water-tight casing, said screw rotating shaft having screw vanes mounted thereon, and in said casing, two straightening plates or more in the form of a thin plate each having a plane intersecting at a right angle to a front surface of the screw vanes are disposed at least symmetrically to an axis of the screw vanes on the front surface of said screw vanes, said casing having water holes bored in a rear portion and side portions thereof.

According to a second invention, there is provided a screw type water flow generating apparatus, having the structure as in the aforementioned first invention, further including a support frame mechanism portion comprising a fixed portion engaged with and fixed to an edge portion of a water tank, and a support base portion on which a casing is placed and fixed, which is adjusted in vertical movement along said fixed portion and which is fixed to said fixed portion.

(Function)

Common to both the above-described inventions, in installation of the apparatus into the water flow tank, at least the engine portion is installed at a position above a water level, and the screw vanes are installed to be submerged into water.

A water flow extruded by the rotating screw vanes assumes a turbulent state but the turbulent water flow is straightened by the straightening plates disposed close to the rear surface of the screw vanes and changed into a water flow which flows in parallel along the axis of the screw vanes.

In the second invention, the apparatus can be simply installed in the water-flow water tank by the fixed portion of the support frame mechanism. Further, the support base portion is adjusted in movement corresponding to a water level in the water-flow water tank to set the screw vanes to a suitable position.

(Effect)

According to the screw type water flow generating apparatus of the present invention, there is provided a simple mechanism in which a screw driving device is provided within a casing. Therefore, the whole apparatus can be small in size, is portable and can be manufactured at a lower expense. Accordingly, it takes no time for installation as in the prior art but the apparatus can be installed simply.

Further, the water flow to be turbulent and scattered by the rotating screw vanes is formed into a laminar flow and concentrated by the straightening plates whereby a large water flow energy is produced and the water flow can be sent far away at a high flow velocity.

If the support frame mechanism portion is provided, a position of the screw can be set to an optimum position according to a water level of the water-flow water tank, thus obtaining an effective water flow state.

DETAILED DESCRIPTION OF THE PREFERRED EMBODIMENTS

An embodiment of a screw type water flow generating apparatus according to the present invention will be described herein below with reference to the drawings.

(Structure of the Embodiment)

Figure 1:
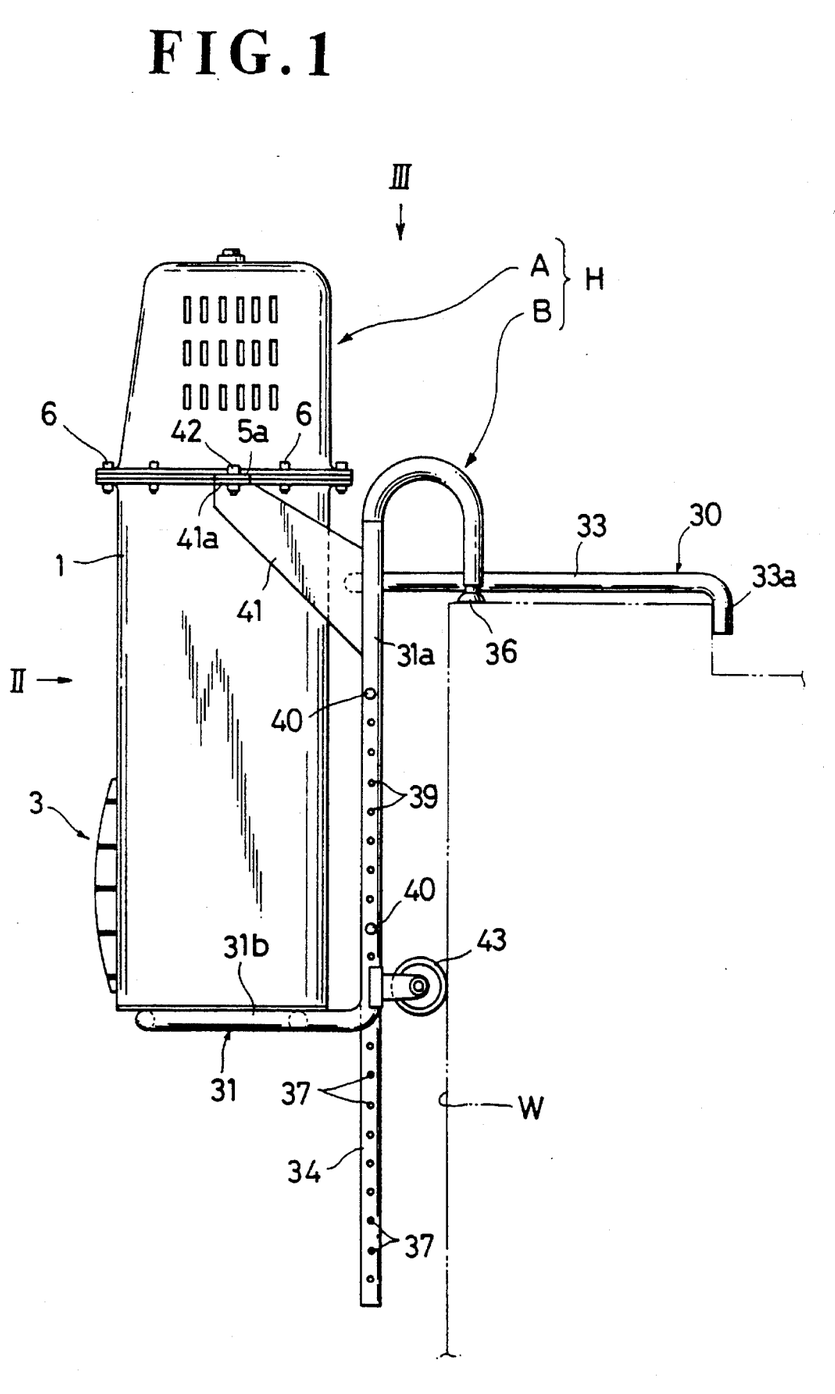
FIG. 1 is a side view showing the whole screw type water flow generating apparatus according to one embodiment of the present invention.
Figure 2:
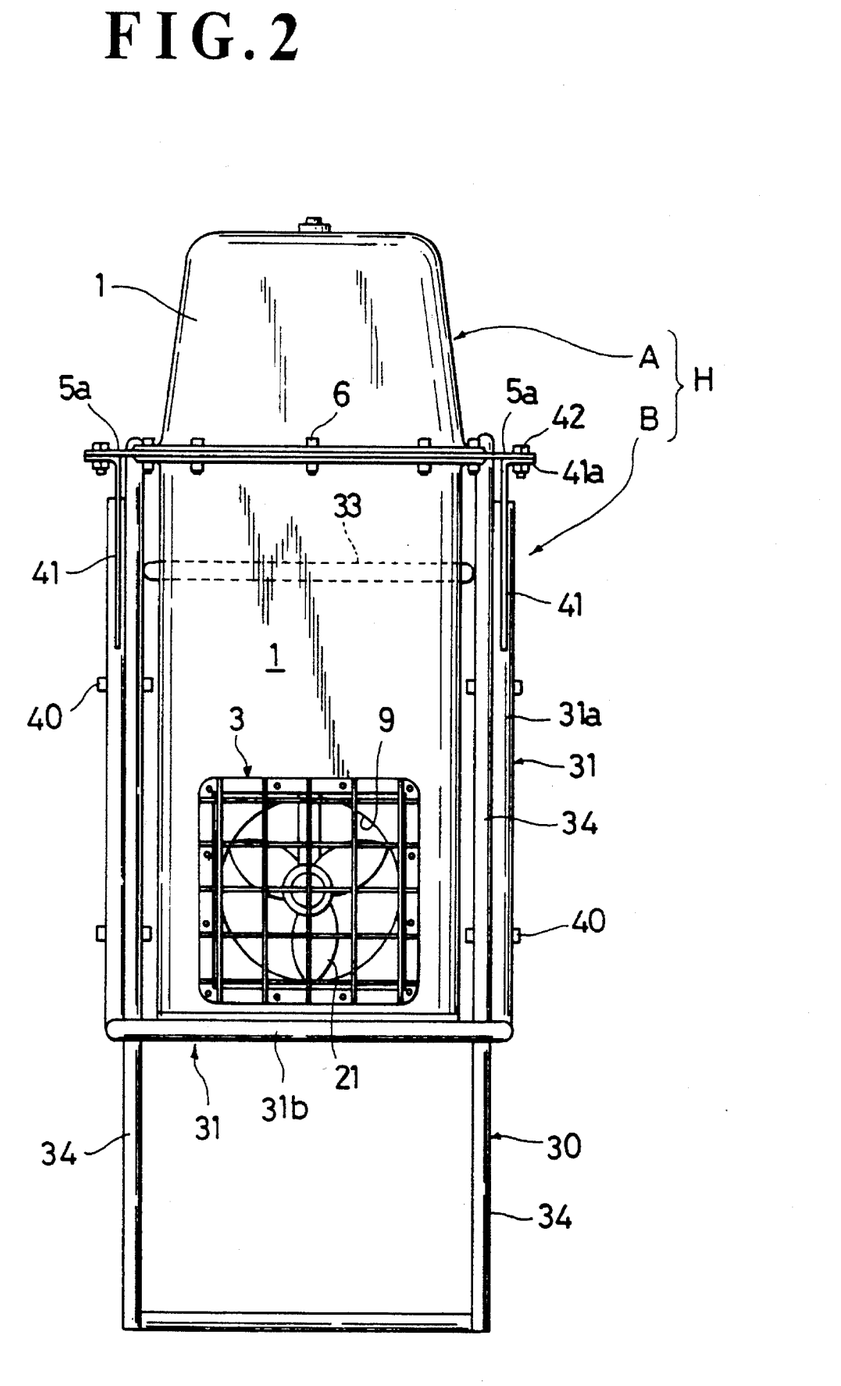
FIG. 2 is a front view of FIG. 1 (a view taken in a direction of II in FIG. 1).
Figure 3:
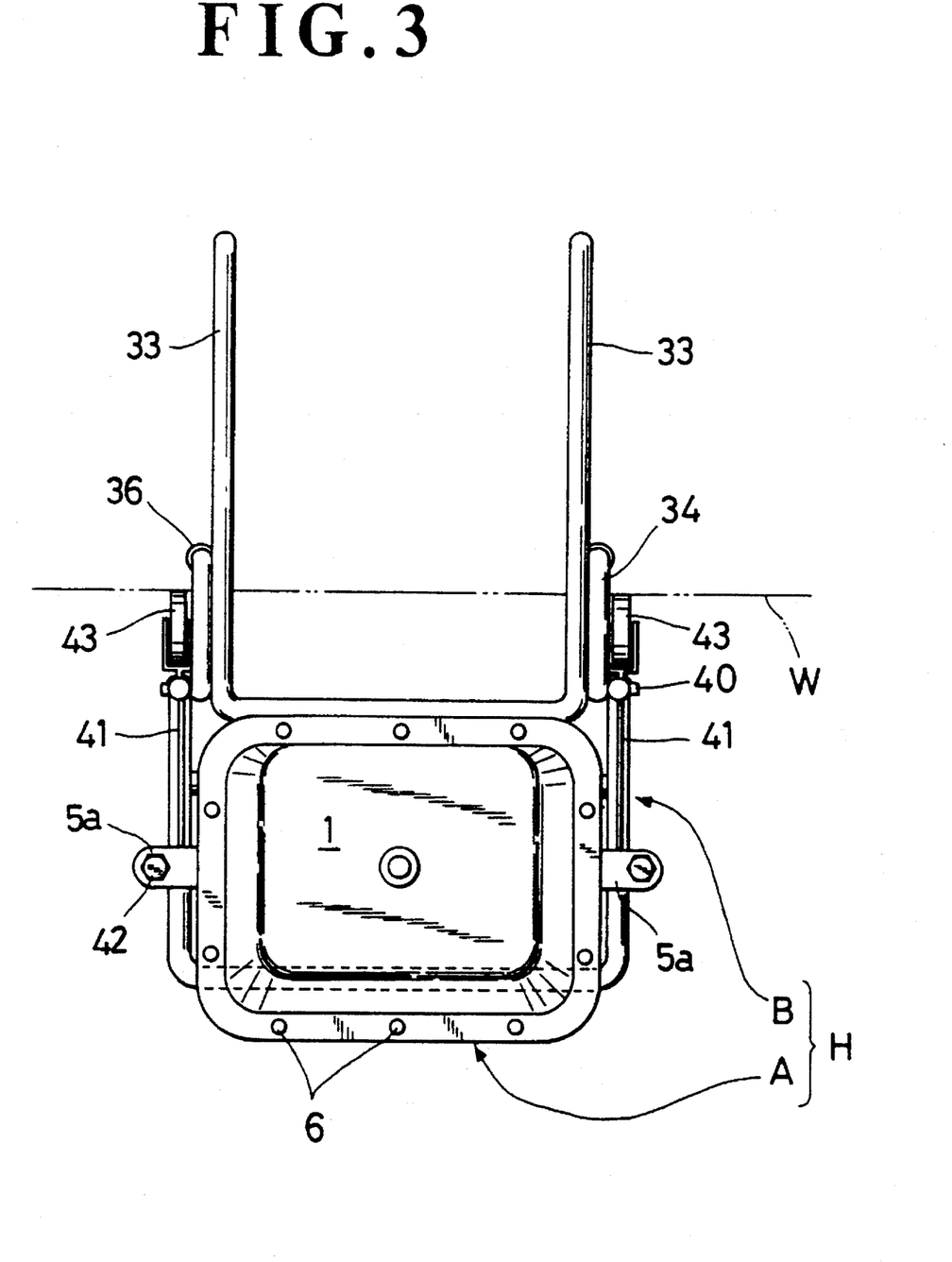
FIG. 3 is a plan view of FIG. 1 (a view taken in a direction of III of FIG. 1).

FIGS. 1 to 8 show a screw type water flow generating apparatus according to one embodiment, in which the apparatus is applied to a water flow pool. That is, FIGS. 1 to 3 show the whole structure of the apparatus, and FIGS. 4 to 8 show structures of essential parts thereof.

FIGS. 1 to 3 show an external structure of a screw type water flow generating apparatus H.

As shown in the drawings, the screw type water flow generating apparatus H is composed of a water flow generating mechanism portion A and a support frame mechanism portion B. That is, the water flow generating mechanism portion A has its lower portion submerged into water and has a function to jet a water flow frontwardly, and the support frame mechanism portion B has a function to support the water flow generating mechanism portion A.

The structures of the water flow generating mechanism portion A and the support frame mechanism portion B will be described below in order.

Figure 4:
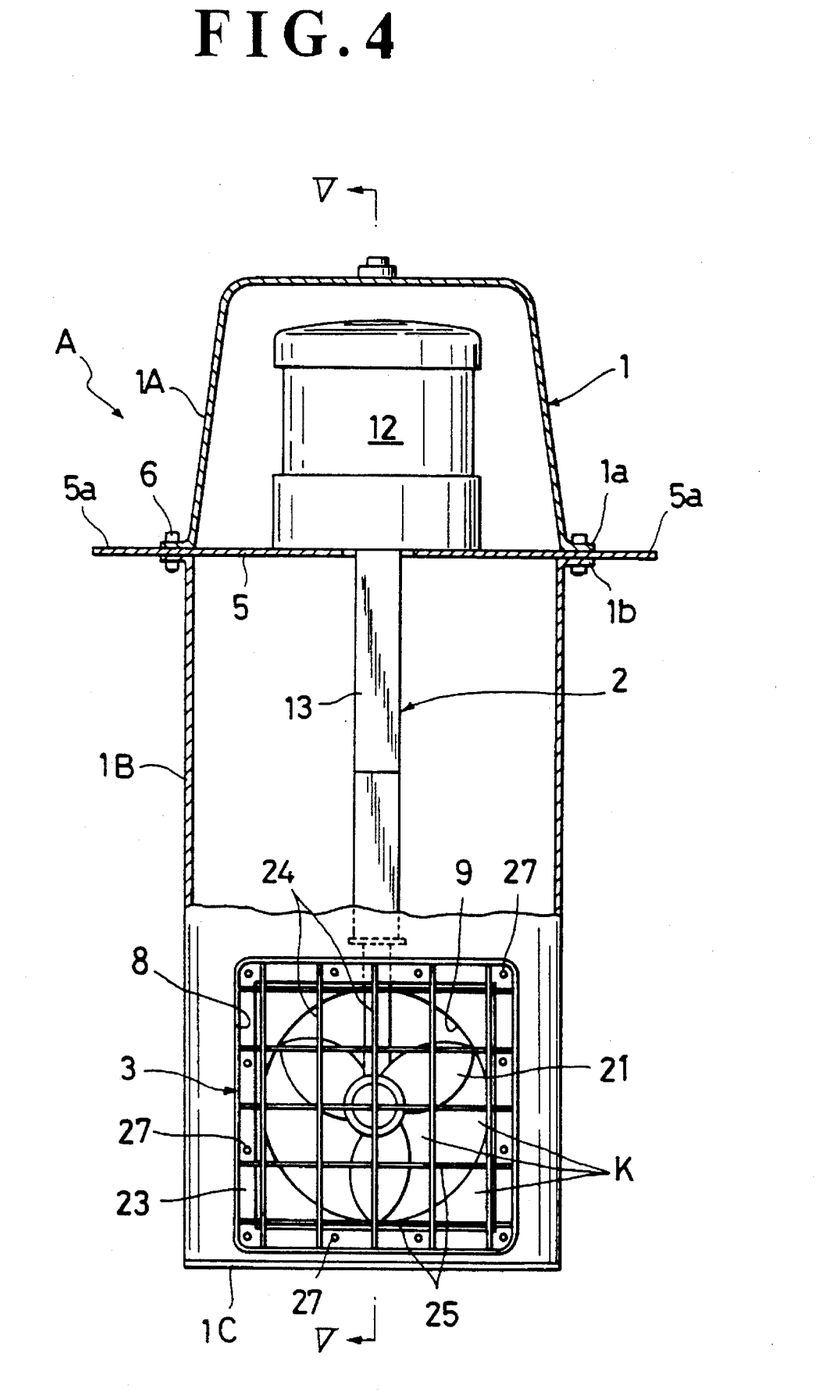
FIG. 4 is a structural view showing an internal construction of a water flow generating mechanism portion A.
Figure 5:
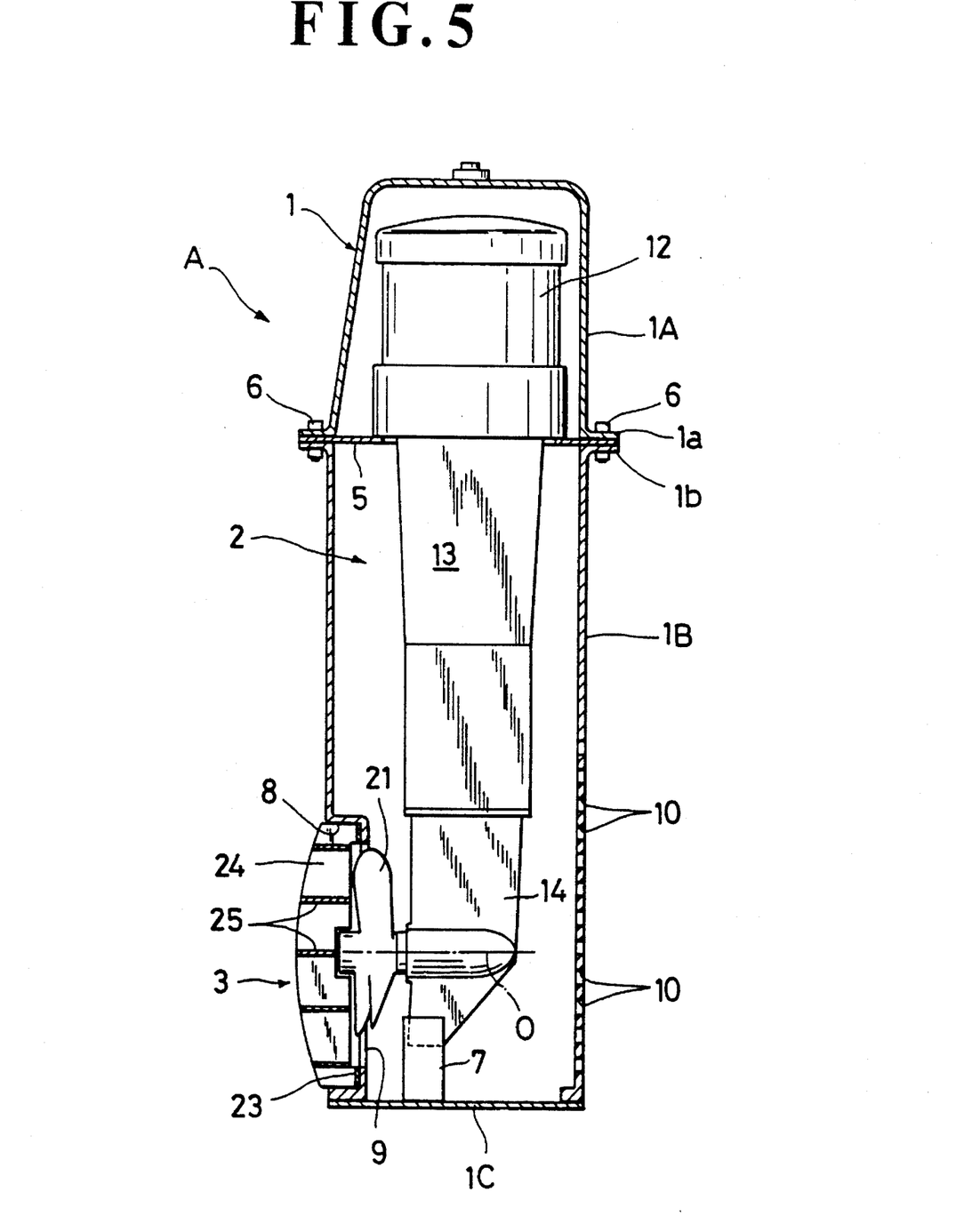
FIG. 5 is a sectional view taken on line V—V of FIG. 4.
Figure 6:
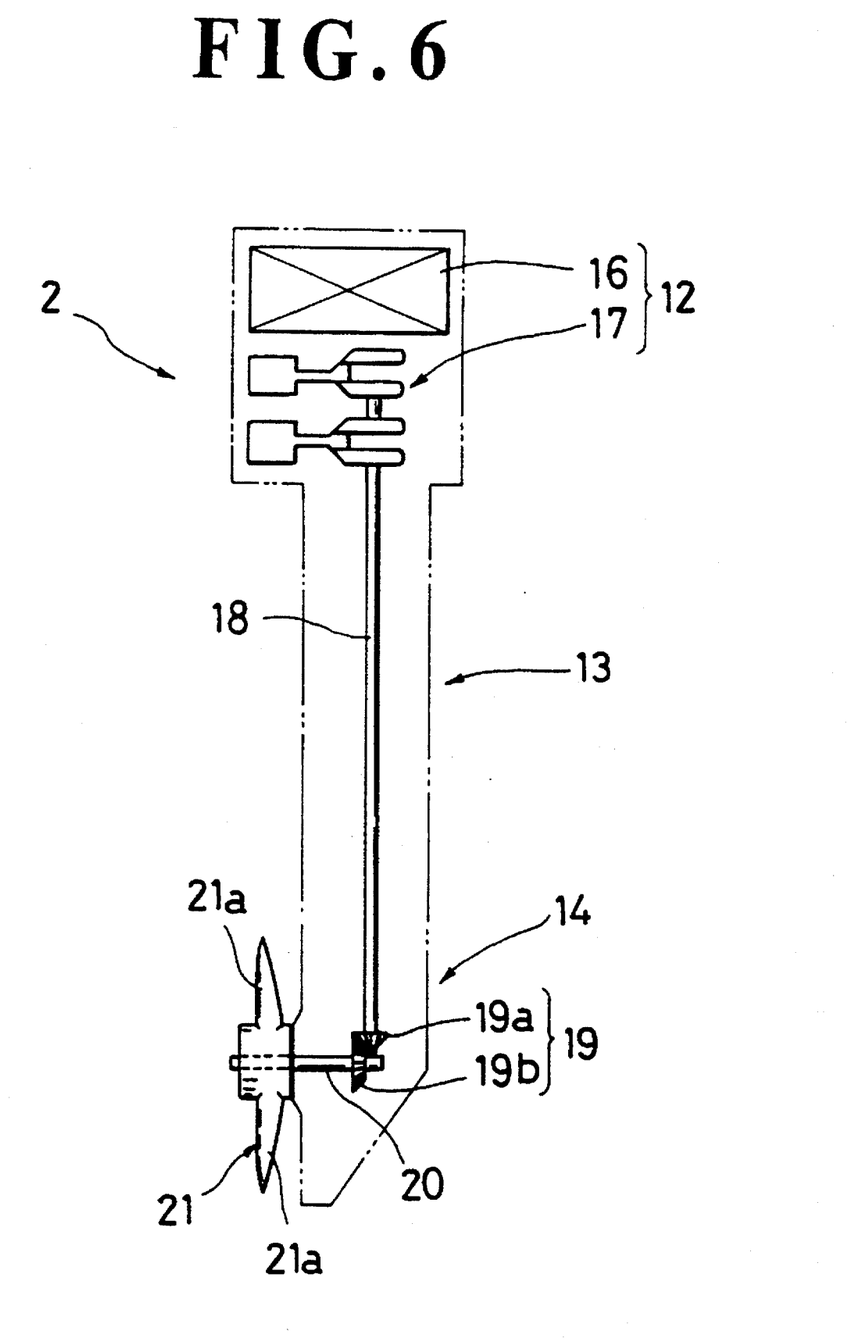
FIG. 6 is an internal structural view of a screw driving device.

FIGS. 4 to 6 show the water flow generating mechanism portion A taken out. The detailed structure of the water flow generating mechanism portion A will be described with reference to these drawings.

The water flow generating mechanism portion A includes a casing 1, a screw driving device 2 loaded and provided in the casing 1, and a straightening portion 3 mounted on the casing 1.

More specifically, the casing 1 has substantially a rectangular parallelopiped shape, which is divided into an upper casing 1A and a lower casing 1B, which are then integrally assembled by bolts and nuts 6 with an upper mounting plate 5 sandwiched between flanges 1a and 1b opposed to each other. Reference numeral 1C denotes a bottom plate, and numeral 7 denotes a lower mounting member stood upright on the bottom plate 1C. The upper mounting plate 5 is formed with an outwardly projecting mounting rib 5a.

The casing 1 is formed at a front and lower portion thereof with a mounting recess 8 for receiving the straightening portion 3, and the mounting recess 8 is bored with a single large-diameter water hole 9. The casing 1 is bored at the rear thereof with a plurality of small-diameter water holes 10.

The screw driving device 2 is composed of a fuel tank engine portion 12 at an upper portion, a column portion 13 at an intermediate portion and a screw portion 14 at a lower portion, which are integrated and water-tightly held by the casing.

FIG. 6 shows an internal structure of the screw driving device 2.

As shown, the fuel tank engine portion 12 is provided with a fuel tank 16 and an engine 17 which forms a fuel supplied from a fuel tank 16 into a mixture with air through a carburetor (not shown) and obtains a rotating and driving force by explosion of the mixture.

A rotational shaft 18 for transmitting a turning force by the rotating and driving force of the engine 17 is disposed on the column portion 13, and one bevel gear 19a of a bevel gear mechanism 19 is mounted on the lower end of the rotational shaft 18.

A horizontal screw shaft 20 having the other bevel gear 19b meshed with the bevel gear 19a mounted thereon is disposed in the screw portion 14, and the rotation of the rotational shaft 18 is transmitted to the screw shaft 20. A screw vane 21 is mounted on the end of the screw shaft 20. The screw vane 21 is disposed to face the water hole 9 in the front surface of the casing 1.

The screw vane 21 used in the present embodiment comprises a three-vane generally often used. The individual screw vane 21a is formed by torsional working with a predetermined curvature, which has a function, upon rotation thereof, to suck water from the rear surface thereof from a difference in a flow distance along a curved surface and extrude water toward the front surface.

The straightening portion 3 is composed of a square frame 23, a plurality of longitudinal straightening plates 24 secured to the frame 23, and a plurality of lateral straightening plates 25 likewise secured to the frame 23 and intersecting at right angles to the longitudinal straightening plates 24.

More specifically, the frame 23 has a predetermined width and is fitted into the mounting recess 8 of the casing 1 and fixed by mounting bolts 27.

The straightening plates 24 and 25 are respectively in the form of a rectangular flat plate and are formed as thin as possible within the range so as not to constitute a resistance to the water flow. The straightening plate has a predetermined width.

Both the longitudinal and lateral straightening plates 24 and 25 have their plate surfaces arranged along a plane intersecting at right angles to the screw surface to take a symmetrical shape with respect to a shaft center 0 of the screw vane 21. The longitudinal and lateral straightening plates 24 and 25 are interiorly formed with closed defining spaces K. The outermost longitudinal and lateral straightening plates 24 and 25 may be omitted.

Figure 7:
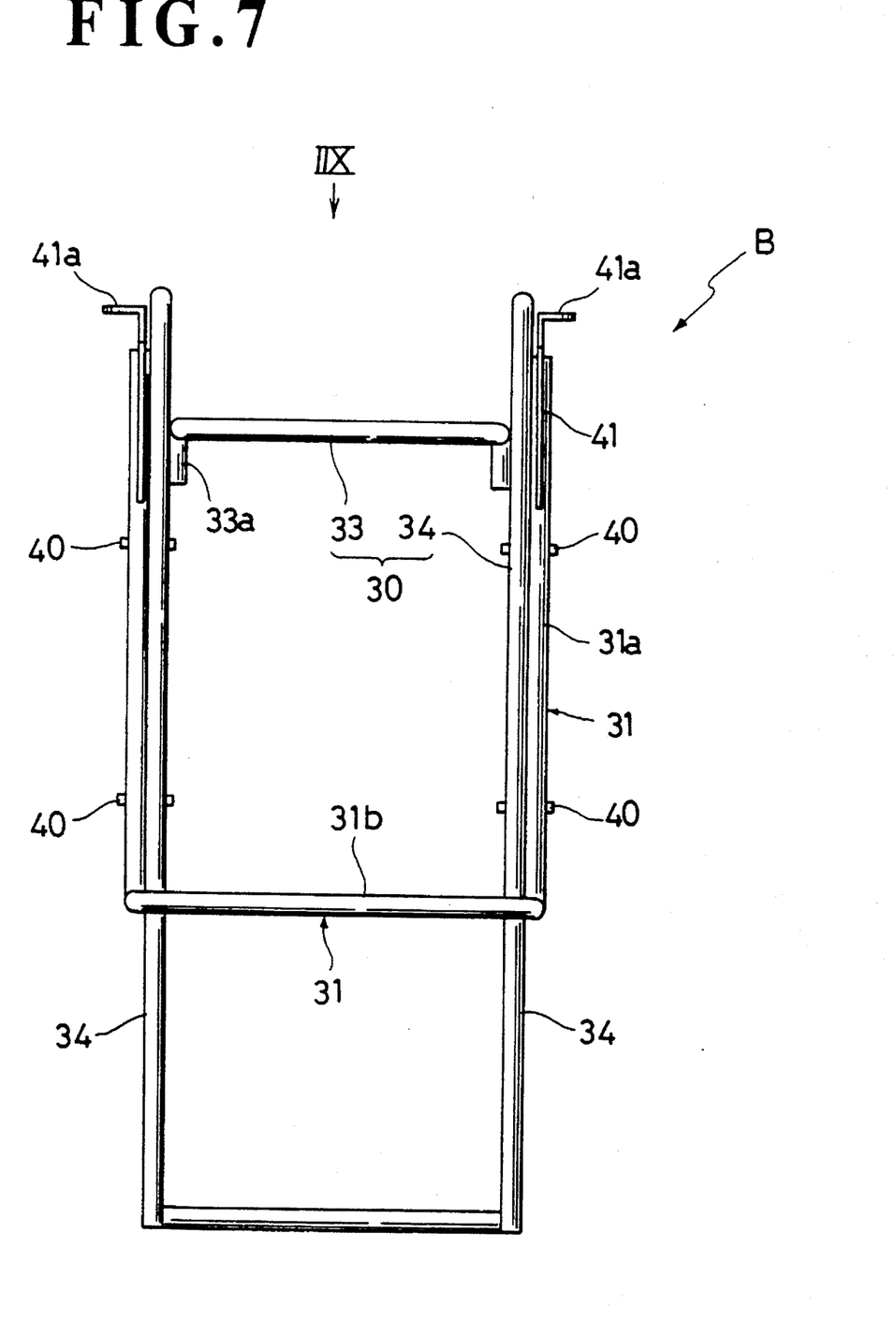
FIG. 7 is a front view of a support frame mechanism portion B (a view taken in a direction of VII in FIG. 8).
Figure 8:
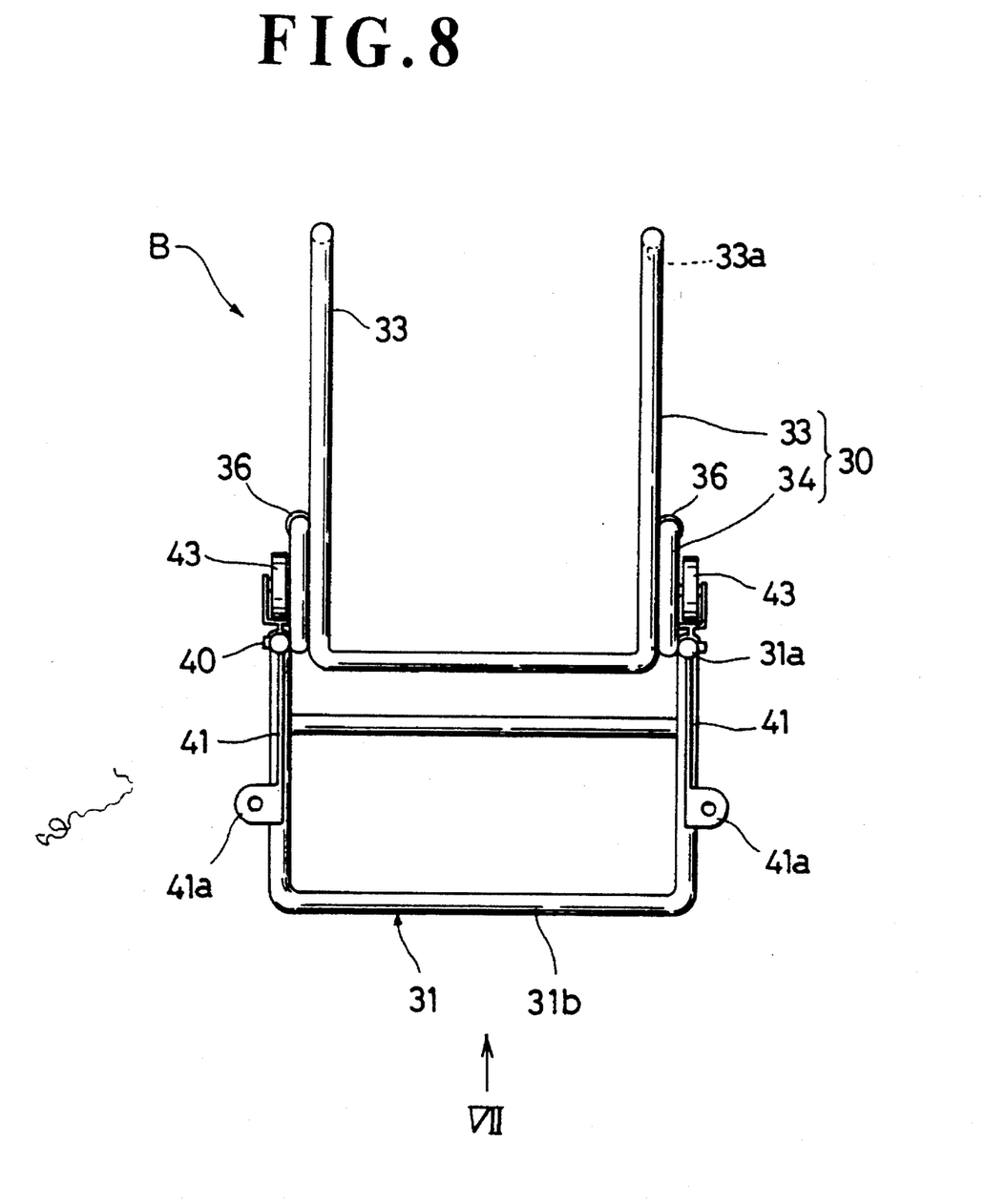
FIG. 8 is a plan view of the support frame mechanism portion B (a view taken in a direction of line IIX in FIG. 7).

FIGS. 7 and 8 show the support frame mechanism portion B taken out.

Referring to these drawings and FIGS. 1 to 3, the support frame mechanism B is composed of a fixed portion 30 and a support base portion 31, both of which are formed from a pipe.

That is, the fixed portion is engaged with and fixed to the edge of a water flow pool W, and the support base portion 31 on which a casing 1 is placed, which is adjusted in vertical movement along the fixed portion 30 and which is fixed to the fixed portion 30.

More specifically, the fixed portion 30 is composed of an engaging portion 33 and a guide portion 34.

That is, the engaging portion 33 is horizontally arranged, and a bent portion 33a at the end thereof is engaged with the edge of the water flow pool W. It is a matter of design that the engaging portion 33 is expansible and takes a form corresponding to the width of the edge of the water flow pool W.

The guide portion 34 is mounted to be hung vertically and downwardly by a pin coupling at the other end of the engaging portion 33, and an upper portion thereof is bent rearwardly while a lower end thereof is seated on the upper surface of the edge of the water flow pool W with a leg portion 36. The guide portion 34 is extended downwardly and bored at its side with pin holes 37 in an extending-through manner in a predetermined spaced relation.

The support base portion 31 is composed of a vertical portion 31a and a horizontal portion 31b, and the vertical portion 31a is mounted along the external side of the guide portion 34 of the fixed portion 30. The vertical portion 31a is bored at its side with pin holes 39 corresponding to the pin holes 37 of the guide portion 34 in an extending-through manner to retain their positions by pins 40 inserted into both the pin holes 37 and 39.

The horizontal portion 31b of the support base portion 31 is horizontally extended frontwardly, and the casing 1 is placed on the horizontal portion 31b. The casing 1 has its one end fixedly mounted on the vertical portion 31a, and the other flange 41a is placed in abutment with the mounting rib 5a of the casing 1 through a frontwardly extending fixed bracket 41 and fixed by mounting bolts and nuts 42 interposed therebetween. Thereby, the casing 1 is detachably mounted on the support base portion 31.

On the lower portion of the vertical portion 31a of the support base portion 31 are mounted castors 43 directed at the back. The castors 43 run along the vertical wall surfaces of the water flow pool W.

While in the present embodiment, the support frame mechanism portion B is principally formed from pipes, it is to be noted that other materials as far as they have the operation and effect equal thereto may be used.

(Operation and Effect of the Embodiment)

The screw type water flow generating apparatus according to the present embodiment constructed as described above operates as follows:

In installation of the apparatus to the water flow pool W, first, in the support frame mechanism portion B, fixing of the support base portion to the fixed portion 30 is adjusted by the pins 40 in anticipation of a height of a water level of the water flow pool W.

Subsequently, in the support frame mechanism portion B, the bent portion 33a of the engaging portion 33 of the fixed portion 30 is brought into engagement with the edge of the water flow pool W. The leg portion 36 of the guide portion 34 is placed on the upper surface of the edge of the water flow pool W to set the fixed portion 30.

At this time, since the castors 43 are guided along the vertical wall surfaces of the water flow pool W, the installation of the support frame mechanism portion B is facilitated.

When the support frame mechanism portion B is set, the water flow generating mechanism portion A is then installed.

That is, the casing 1 is placed on the horizontal portion 31b of the support base portion 31, and the flange 41a of the fixed flange 41 is brought into abutment with the mounting rib 5a of the casing 1, which are fixed by the mounting bolts and nuts 42. In this state, a suitable spacing is held with respect to the back of the casing 1.

As the screw driving device 2 drives, the screw vane 21 is rotated so that water within the water flow pool W passes through the water holes 10 at the rear of the casing 1. The water is then sucked from the rear surface of the screw vane 21 and extruded toward the water holes 9 in the front surface. However, since the water flows along the curved surface of the screw vane 21, the water flow will be a turbulent flow. Further, the water flow is scattered from the shaft line 0 of the screw vane 21.

This turbulent water flow is received by the straightening plates 24 and 25 disposed close to the front surface of the screw vane 21 to straighten the flow. That is, the line of flow is made parallel along the shaft line 0 of the screw vane 21. The straightening of flow is promoted by the closed spaces K.

As described above, according to the screw type water flow generating apparatus H in the present embodiment, since a simple mechanism in which a screw driving device 2 is loaded in a casing 1 is employed, the whole apparatus H is small in size and is portable. In addition, the fabricating cost can be lowered. Accordingly, it does not take much time for installation as in the conventional apparatus, and the present apparatus can be simply installed.

Further, the water flow to be turbulent and scattered by the rotating screw vane 21 is formed into a laminar flow and concentrated within the defining spaces K surrounded by the straightening plates 24 and 25 whereby a large water flow energy is produced, and accordingly, a water flow can be sent far away at a high flow velocity.

Moreover, the support bed 31 on which the casing 1 is placed is conveniently used because it can be adjusted according to a height of a water level of the water flow pool W.

While in the aforementioned embodiment, the apparatus has been applied to the water flow pool W, it is to be noted that the apparatus may be applied to other water flow water tanks such as a water flow fish tank, a water flow water purifying treatment tank, a water flow pond and the like in accordance with the aforementioned procedure.

Furthermore, while in the present embodiment, a combination of the water flow generating mechanism portion A and the support frame mechanism portion B has been illustrated, it is to be noted that the support frame mechanism portion B can be suitably omitted.

The present invention is not limited to the above-described embodiment, but it can be variously changed in design within the scope of the basic technical idea according to the present invention. That is, the following modes are included in the technical range of the present invention.

(1) While in the screw driving device 2 of the water flow generating mechanism portion 2, an internal combustion engine has been employed as the engine 17 in the present embodiment, it is to be noted that an electric motor can be used. Further, the rotating and driving force transmission portion is not limited to the rotational shaft 18, but a chain can be of course used.

(2) In the straigtening portion 3, the number of longitudinal and lateral straightening plates 24 and 25 may be suitably adjusted according to the size of the screw vane 21. Further, the spacing between the straightening plates 24 and 25 may be freely set if it is symmetrical with the shaft line 0 of the screw vane 21.

(3) In the support frame mechanism portion B, the leg 36 and the castors 43 are not particularly necessary. Elements having an equal position retaining function or a sliding function can be suitably employed in place of the castors 43.

What is claimed is:

1. A screw type water flow generating apparatus, comprising:

a box-shaped casing comprising an upper casing portion and a lower casing portion, wherein the upper casing portion is coaxially positioned vertically above the lower casing portion;

an engine portion positioned in said upper casing portion for obtaining a rotating and driving force;

a rotating and driving force transmission portion positioned in said lower casing portion, the rotating and driving force transmission portion being operatively connected to said engine portion and coaxially extending from said engine portion;

a screw rotating shaft positioned in a horizontal direction in said lower casing portion and operatively connected to said rotating and driving force transmission portion, said screw rotating shift being substantially perpendicular to the rotating and driving force transmission portion;

screw vanes mounted on said screw rotating shaft and substantially positioned within said lower casing portion at a recess in said casing;

a frame fitted in the recess of said casing; and a plurality of perpendicularly intersecting longitudinal and lateral straightening plates secured to said frame and positioned in front of said screw vanes for straightening water flow, said plurality of intersecting longitudinal and lateral straightening plates defining a plurality of square-shaped spaces, and each of said plurality of intersecting longitudinal and lateral straightening plates being in the form of a thin rectangular flat plate, each of said plurality of longitudinal and lateral straightening plates having a plane intersecting at a right angle to a front surface of said screw vanes and being disposed symmetrically to an axis of the screw vanes;

said casing having water holes bored in at least a rear portion of said casing, wherein rotation of said screw vanes sucks water in through said water holes and leads the water toward the straightening plates in a horizontal direction which is parallel to a rotational axis of said screw rotating shaft.

2. A screw type water flow generating apparatus, comprising:

a box-shaped casing comprising an upper casing portion and a lower casing portion, wherein the upper casing portion is coaxially positioned above the lower casing portion;

an engine portion positioned in said upper casing portion for obtaining a rotating and driving force;

a rotating and driving force transmission portion positioned in said lower casing portion, the rotating and driving force transmission portion being operatively connected to said engine portion and coaxially extending from said engine portion;

a screw rotating shaft positioned in a horizontal direction in said lower casing portion and operatively connected to said rotating and driving force transmission portion, said screw rotating shaft being, substantially perpendicular to the rotating and driving force transmission portion;

screw vanes mounted on said screw rotating shaft and substantially positioned within said lower casing portion at a recess in said casing;

a frame fitted in the recess of aid casing; and at least two straightening plates secured to said frame and positioned in front of said screw vanes, said at least two straightening plates being in the form of a thin plate, each of said at least two straightening plates having a plane intersecting at a right angle to a front surface of said screw vanes and being disposed at least symmetrically to an axis of the screw vanes;

said casing having water holes bored in at least a rear portion of said casing, wherein rotation of said screw vanes sucks water through said water holes and leads the water toward the straightening plates in a horizontal direction which is parallel to a rotational axis of said screw rotating shaft;

said apparatus further comprising:

a support frame mechanism portion including a fixed engaging portion engaged with and fixed to an edge portion of a water tank, a guide portion having a plurality of first pin holes attached to said fixed engaging portion and downwardly extending from said fixed engaging portion into the water tank, and a support portion comprising a vertical portion having a plurality of second pin holes which correspond to the first pin holes of said guide portion and a horizontal base portion on which said casing is placed and fixed, said vertical portion being positioned adjacent to said guide portion, said support portion being movably attached to said fixed engaging portion and adjustably movable in a vertical direction along said guide portion to adjust a height of said casing in accordance with a water level height, wherein a height of said support portion is selectively fixed by inserting a pin in corresponding first and second pin holes of the guide portion and the vertical portion, said support frame mechanism portion further including flange means extending from said vertical portion to said casing for fixing said casing to said vertical portion and on said support portion and maintaining a spacing between said rear portion of the casing and said vertical portion.

\* \* \* \* \*